United States Patent [19]

Fournier et al.

[11] Patent Number: 4,491,235
[45] Date of Patent: Jan. 1, 1985

[54] WOK

[76] Inventors: Robert L. Fournier; Priscilla J. Fournier, both of 5607 N. 22nd St., Arlington, Va. 22205

[21] Appl. No.: 22,276

[22] Filed: Mar. 20, 1979

[51] Int. Cl.³ .............................................. A47J 37/10
[52] U.S. Cl. .................. 220/94 A; D7/360; 126/390
[58] Field of Search ............. 220/94 A, 1 R, 1 H; 126/390; D7/97, 90, 85, 23, 21, 17, 95, 94

[56] References Cited

U.S. PATENT DOCUMENTS

| | | | |
|---|---|---|---|
| D. 174,504 | 4/1955 | Krause | D7/95 |
| D. 181,298 | 10/1957 | Lax | D7/90 |
| D. 187,681 | 4/1960 | Chinn et al. | D7/94 |
| 2,493,983 | 1/1950 | Lindzy | 126/390 |
| 2,722,173 | 11/1955 | Cunningham | 126/390 X |

OTHER PUBLICATIONS

W. Bell & Co., 11/76, p. 291, Item F.
Best Products, 9/76, p. 282, Item B.

Primary Examiner—Steven M. Pollard
Attorney, Agent, or Firm—A. W. Breiner

[57] ABSTRACT

A wok having a bowl-shaped configuration including a relatively shallow curving bottom portion and curving sides which increase in slope upwardly is described. The wok differs from customary woks in that the exterior surface of the bottom portion is flat so that the thickness of the bottom portion increases from the center generally radially outwardly and this thickened material forms a heat sink. The flat exterior bottom permits the wok to be seated on electrical heating surfaces for maximum heat transfer. The wok is also provided with a handle construction which includes a pair of oppositely directed handles integrally formed with the bowl-like utensil portion and extending outwardly and terminating in grip members formed of insulating material.

7 Claims, 5 Drawing Figures

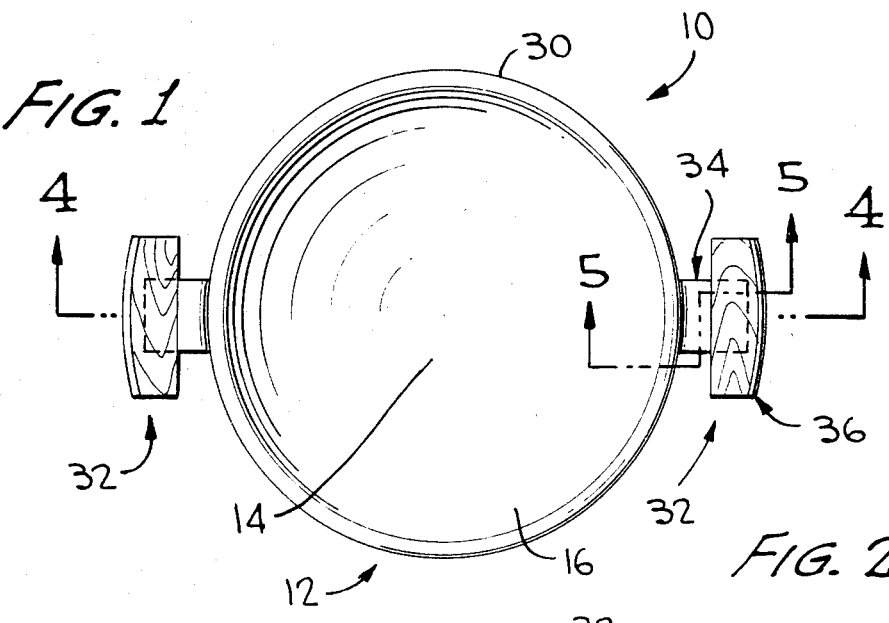
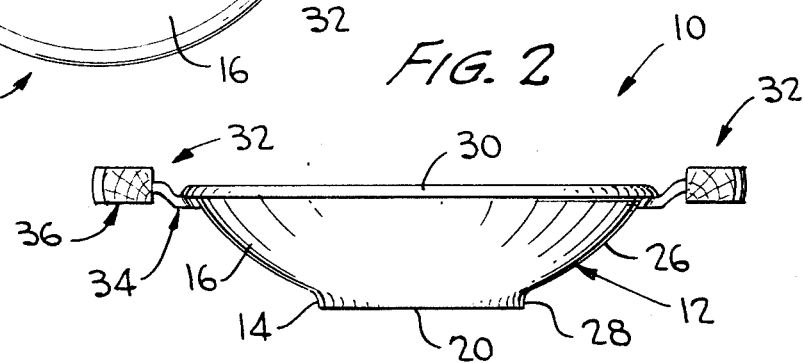
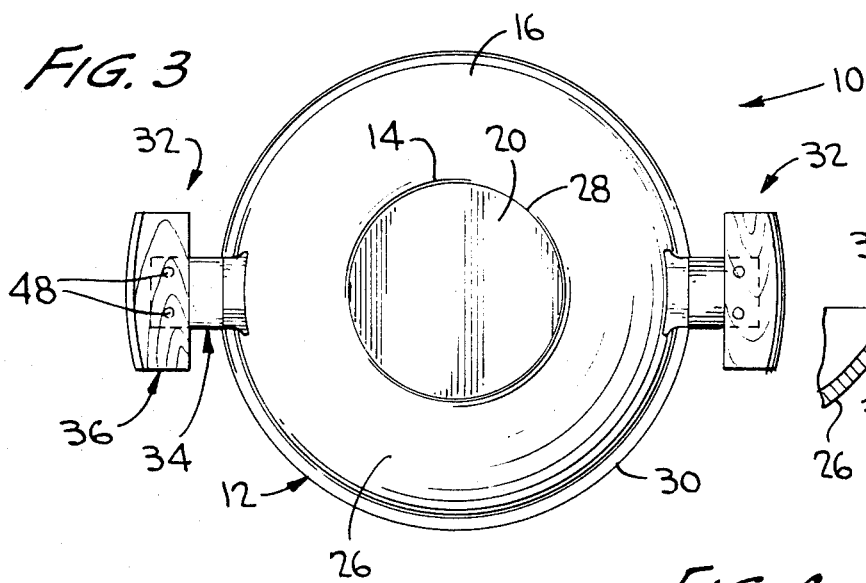
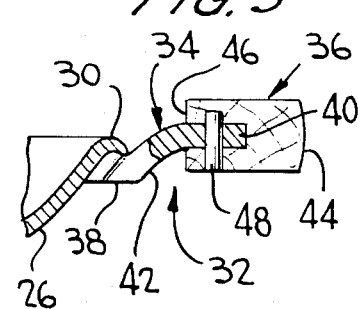
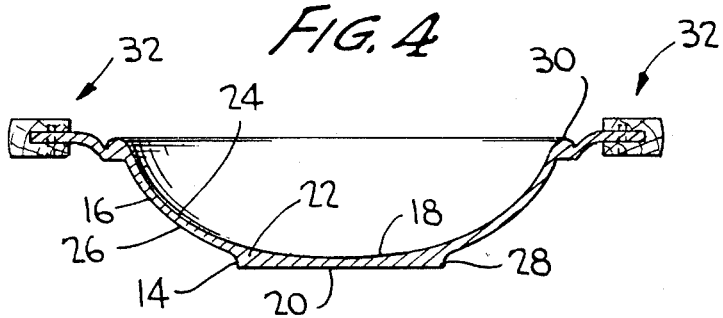

WOK

This invention relates in general to new and useful improvements in cooking utensils, and more particularly, to an improved wok.

As is well known, the wok is generally in the form of a bowl-like utensil in which foods are rapidly cooked while being stirred. The usual wok has a curved interior and a somewhat-like curved exterior surface and was primarily intended to be used with a flame or charcoal heat source as opposed to a heat source having a flat heat transferring surface, particularly those of smooth-topped electric stove heating surfaces. As a result, the usual wok is not stable and has a tendency to tip during the stirring of a food being cooked therein unless used with a ring or other stabilizing means.

In accordance with this invention, it is proposed to provide a novel wok in the form of a bowl-like utensil having a curving interior surface which includes a rather shallow, curved bottom portion and an increasingly upwardly sloping sidewall portion. At the same time, the utensil has a flat bottom portion which terminates in an upwardly sloping sidewall portion. The bottom part of the utensil increases in thickness radially outwardly to the periphery of the flat bottom surface and thus the bottom portion of the utensil is in the form of a heat sink. The utensil wall extending radially outwardly and upwardly from the bottom part is generally of constant thickness and the slope is such that the food being cooked within the wok, as it is stirred, will gently return to the central bottom part where the energy is primarily stored.

Another feature of the wok of the present invention is in the handle construction wherein the peripheral edge of the bowl-like utensil is radially outwardly and downwardly curved and the utensil has handles inwardly formed therewith, the handles projecting from the exterior surface of the utensil below the rim. It is preferred that the handles are of an offset construction so that radially outer ends of the handles are disposed generally above the rim. This construction provides for a more stable support for the wok.

Finally, the wok has grip members carried by the handles. Each grip member is in the form of a block of insulating material which is generally rectangular in outline and has a radially outer edge which is curved both in plan and elevation. The associated handle preferably has the radially outer portion thereof projecting into and embedded in the block. Pins extending upwardly from the other side of the block pass through the outer handle portion and anchor the block on the handle.

Having described the invention in general terms, specific and presently preferred embodiments will be set forth in the context of the illustrative drawing.

FIG. 1 is a plan view of the wok and shows the details thereof;

FIG. 2 is a side elevational view of the wok of FIG. 1;

FIG. 3 is a bottom plan view of the wok of FIG. 1;

FIG. 4 is a transverse vertical sectional view taken generally along the lines 4—4 of FIG. 1 and shows the specific cross section of the wok;

FIG. 5 is an enlarged fragmentary vertical sectional view taken generally along the lines 5—5 of FIG. 1, and most specifically illustrates the details of the handle and associated grip member.

Referring now to the drawing, the wok formed in accordance with this invention is generally identified by the numeral 10. The wok 10 includes a bowl-like utensil generally identified by the numeral 12. The utensil 12 is preferably formed of cast metal such as cast iron, and is preferably circular in outline as is shown in FIGS. 1 and 3. The utensil 12, for descriptive purposes, is divided into a bottom part 14 and a sidewall part 16. The interior surface of the bottom 14 is identified by the numeral 18 and slopes gently radially outwardly and upwardly from the center of the utensil. This curving bottom surface 18 forms the primary heating or cooking surface of the wok.

The bottom part 14 has a flat exterior bottom surface 20 which is preferably circular in outline, as is shown in FIG. 3. The flat bottom surface 20 in combination with the curving bottom surface 18 results in a gradually radially outwardly thickening of the bottom part 14 so as to result in a mass of metal which forms a heat sink 22. The flat external bottom surface 20 also functions as a base on which the wok is stably supported.

The sidewall part 16 includes a radially outwardly and upwardly curving interior surface 24 which is a continuation of the curving bottom surface 18. It is to be noted, however, that the surface 24 gradually increases in slope so that the upper portion of the surface 24 begins to approach the vertical. The sidewall part 16 also includes a curved exterior surface 26 which is essentially concentric to the surface 24 so that the sidewall part 16 is of a substantially constant thickness. It will be seen that the exterior curved surface 26 is joined to the flat bottom surface 20 by a shoulder 28.

From the foregoing description of the wok and the particular reference to the drawing, it will be apparent that the wok 10, is very stable in its support and thus the chances of the wok being unduly tipped so as to spill the food being cooked therein during stirring and handling is greatly minimized. At the same time, the interior surface of the wok is such that food which is being stirred and moved up on the sidewall part 16 is directed by the rather sharply sloping interior surface 24 back down onto the curving bottom surface 18.

Because of the greater amount of metal in the bottom part 14, heat sink 22 formed by the metal accumulates and retains a large amount of the heat. Thus, although the food being cooked may be constantly stirred, a substantially uniform temperature is maintained at the curving interior bottom surface 18 for uniform cooking of the food.

Not only does the flat bottom surface 20 provide an excellent base for the supporting of the wok, this flat surface permits the wok to be placed on various heating surfaces including modern planar electric heating surfaces. Thus a maximum heat transfer may be obtained, thereby greatly increasing the efficiency of the wok. At the same time, the wok may be utilized in conjunction with other heat sources, including open flame, charcoal, etc.

Referring now primarily to FIG. 5, it will be noted that the bowl-like utensil 12 terminates at its upper free edge and a downwardly and radially outwardly curving rim 30. The rim 30 eliminates any sharp edges and permits the cooked food to be readily poured from the wok.

In FIG. 5 there is also illustrated the handle construction in accordance with this invention. There are a pair of diametrically opposite handle assemblies, each identified by the numeral 32. Each handle assembly 32 includes a handle 34 and an insulated grip member 36. Each handle 34 is inwardly cast with the utensil 12 and projects from the exterior surface 26 immediately below the rim 30. Each handle 32 includes an attaching portion 38 and a grip member mounting portion 40. Each handle 34 has an intermediate offset portion 42 between the portions 38 and 40 so that the mounting portion 40 generally lies above the plane of the rim 30 and thus provides for a more stable supporting of the wok. The grip member 36 is preferably in the form of a generally rectangular block, as is shown in FIGS. 1 and 3, and has a curved outer edge 44. The outer edge 44 curves both in plan, as shown in FIGS. 1 and 3, and in elevation, as shown in FIG. 5. The shape of the block which forms the grip member 36 is such that it may be readily grasped in one hand with the edge 44 engaging the palm of one's hand so as to provide for firm engagement. The block which forms the grip member 36 has an inner edge 46 in which an outwardly directed slot 48 is formed. The slot 48 snuggly receives the mounting portion 40 of the associated handle 34 and the grip member 36 is fixedly secured on the handle 34 by a pair of pins 48 which extend from the under surface of the grip member 36 up to and through the mounting portion 40, as is most clearly shown in FIG. 5. This provides for a firm anchoring of each grip member 36 on its associated handle 34. The insulating material from which each grip member 36 is formed is preferably wood. The wood is preferably a hard wood and may be selected to have a pleasant grain arrangement, as is generally shown in FIG. 1. Thus the grip member 36 is not only functional, but also attractive.

It is apparent that the wok is a relatively large utensil and being formed of cast iron, is quite heavy. Accordingly, it is extremely beneficial to provide a handle construction wherein the wok may be readily supported and handled. Accordingly, the handle construction shown in FIG. 5, including the shape of the grip member 36, has proven to be highly advantageous.

Although only a preferred embodiment of the wok has been specifically illustrated and described herein, it is to be understood that minor variations may be made therein without departing from the spirit and scope of the invention, as defined by the appended claims.

I claim:

1. A cast iron wok comprising a bowl-like cooking utensil having an interior and an exterior, said utensil interior including a continuously curving bottom surface, and said utensil exterior including a flat bottom surface, said utensil exterior and interior curving upwardly and radially outwardly from said flat bottom surface and said curving bottom surface in generally concentric relation with said utensil wall above said bottom being substantially of uniform thickness, said utensil wall terminating in a rim, said rim extending radially outwardly from said utensil wall and curving downwardly, said flat bottom surface and said curving bottom surface combining to define a wall portion of greatest thickness at the bottom of said utensil in the form of a heat sink, said wok including insulated handle means extending outwardly from said exterior surface substantially immediately below said rim.

2. A wok according to claim 1 wherein said handles are integral and extend radially outwardly from said exterior surface immediately below said curving rim, and said handles carry insulated grip members having radially outer portions of said handles embedded therein.

3. A wok according to claim 2, wherein outer portions of said handles are vertically offset to generally lie above said rim.

4. A wok according to claim 2, wherein said handles carry insulating grip members having radially outer portions of said handles embedded therein.

5. A wok according to claim 2 wherein each of said handles carries an insulating grip member in the form of a generally rectangular block, each block having a radially outer face curved in both plan and elevation.

6. A wok according to claim 5 wherein each handle has a radially outer end embedded in the respective block.

7. A wok according to claim 5 wherein each handle has a radially outer end embedded in the respective block and a radially inner end downwardly offset from said outer end.

* * * * *